(12) United States Patent
Furman et al.

(10) Patent No.: US 8,348,560 B1
(45) Date of Patent: Jan. 8, 2013

(54) TOOL HEAD FOR A MACHINE TOOL

(75) Inventors: Wojciech Furman, Lake In The Hills, IL (US); Jack Maczuga, Crystal Lake, IL (US)

(73) Assignee: Variable Operations Technologies, Inc., Crystal Lake, IL (US)

(*) Notice: Subject to any disclaimer, the term of this patent is extended or adjusted under 35 U.S.C. 154(b) by 933 days.

(21) Appl. No.: 12/419,711

(22) Filed: Apr. 7, 2009

Related U.S. Application Data (60) Provisional application No. 61/192,265, filed on Sep. 18, 2008.

(51) Int. Cl.
 *B23C 3/12* (2006.01)
(52) U.S. Cl. ......... 409/138; 409/234; 408/97; 408/112
(58) Field of Classification Search ............... 409/132, 409/138, 234; 408/95, 97, 110, 112
 See application file for complete search history.

(56) References Cited

U.S. PATENT DOCUMENTS

| | | | |
|---|---|---|---|
| 2,359,309 A | 10/1944 | Hayes | |
| 2,408,652 A | 10/1946 | King | |
| 2,522,330 A | 9/1950 | Wright | |
| 2,905,030 A | 9/1959 | Cogsdill | |
| 3,060,772 A | 10/1962 | Crump | |
| 3,126,793 A | 3/1964 | Jennings et al. | |
| 3,689,171 A | 9/1972 | Bouzounie | |
| 4,115,017 A | 9/1978 | Wilhelmsson | |
| 4,158,987 A | 6/1979 | Smith | |
| 4,244,669 A | 1/1981 | Puritz et al. | |
| 4,514,122 A | 4/1985 | Campbell | |
| 4,515,505 A | 5/1985 | Frisbie et al. | |
| 4,735,528 A | 4/1988 | Parrone | |
| 5,133,629 A | 7/1992 | Pfalzgraf et al. | |
| 5,259,100 A | 11/1993 | Takahashi | |
| 6,264,590 B1* | 7/2001 | Ferrari | 483/13 |
| 7,128,506 B2 | 10/2006 | Ferrari et al. | |

FOREIGN PATENT DOCUMENTS

EP 0346231 A1 12/1989

* cited by examiner

*Primary Examiner* — Edward Tolan
*Assistant Examiner* — Robert Lichter
(74) *Attorney, Agent, or Firm* — Matthew R. P. Perrone, Jr.

(57) ABSTRACT

A tool head suitable for use in a machine tool for shaping the edge of a plastic sheet, which holds and shapes the edge of plastic sheet while a vacuum on the machine tool holds the center of the plastic sheet. Having such a desired edge renders the plastic sheet suitable for further manufacturing treatment.

13 Claims, 10 Drawing Sheets

TOOL HEAD FOR A MACHINE TOOL

CROSS REFERENCE TO RELATED APPLICATION

This application is based, in part, on U.S. Provisional Application Ser. No. 61/192,265, filed on Sep. 18, 2008, and incorporated herein by reference.

This invention relates to a tool head for a machine tool and more particularly to a tool head for a machine tool, which holds the edge of a plastic piece while machining the same to a desired shape.

BACKGROUND OF THE INVENTION

While, many devices and machine tools are known for machining or otherwise shaping plastics, many difficulties still remain in turning raw plastic material into a desired product. Certain products require an edge modification of the plastic. While there are many ways to modify the edge of a plastic sheet in order to form products therefrom, it is desired to shape and machine an edge of the sheet at the same time.

With such a process, a difficulty is cooling the tool, during the use thereof. If a tool is strong enough to carry out the tooling process, the structure may make the tool difficult to cool. If the tool can be cooled easily, it is hard to obtain the necessary strength to achieve the desired results with the machining process.

However, positioning the plastic sheet, holding the sheet in a desired position, and working the edge of the sheet at the same time creates many complications. If the tool can be designed to accomplish these desired functions, great advantages can be obtained.

SUMMARY OF THE INVENTION

Among the many objectives of the present invention is the provision of a tool head to machine an edge of a plastic sheet.

Another objective of the present invention is the provision of a tool head to shape an edge of a plastic sheet.

Yet another objective of the present invention is the provision of a tool head to shape an edge of a plastic sheet, which can be cooled during the machining.

Still another objective of the present invention is the provision of a durable tool head to shape an edge of a plastic sheet.

Also, an objective of the present invention is the provision of a tool head to hold an edge of a plastic sheet.

These and other objectives of the invention (which other objectives become clear by consideration of the specification, claims and drawings as a whole) are met by providing a tool head suitable for use in a machine tool for shaping the edge of a plastic sheet, which holds and shapes the edge of plastic sheet in order to render it suitable for further a manufacturing treatment or a manufacturing process.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

The tool head has a mounting head secured to a machining head. The mounting head is secured in a machine tool. The machining head contacts the desired workpiece. The machining head preferably has a cylindrical housing, with an open end to receive the mounting head and a closeable end to receive the machining head to contact plastic sheet or other desired workpiece.

The machining surface is bearing supported and spring loaded to facilitate contact with the plastic edge. While the center of the plastic sheet is held in position on the machine tool, the tool head can shape or otherwise modify the edge of the plastic sheet for further manufacturing processes or treatment. For example, the sheet can be used to form a cassette. The cassette can then be used in a number of ways. There are medical uses and entertainment uses to name a few uses.

Preferably, a vacuum positions the sheet on the machine tool and holds the sheet, especially the center portion of the sheet, on the machine tool. The tool head both holds and shapes the edge of the plastic sheet. Combined with the vacuum holding, the edge shaping and forming becomes more efficient.

Within the bearing support connecting the machine surface to the cylinder are springs and bearings adapted to hold the machining surface in the desired position as the tool moves around the edge of the plastic sheet. The side of the cylinder or cylinder wall has at least one opening, so that coolant may flow around the cutting or machining surface, and cool the same if desired.

Throughout the description, reference is made to the tool head shaping the edge of a plastic sheet. However, the tool head of this invention can also be used to machine aluminum, metal, or any other material—especially materials in sheet form.

Figure 1:
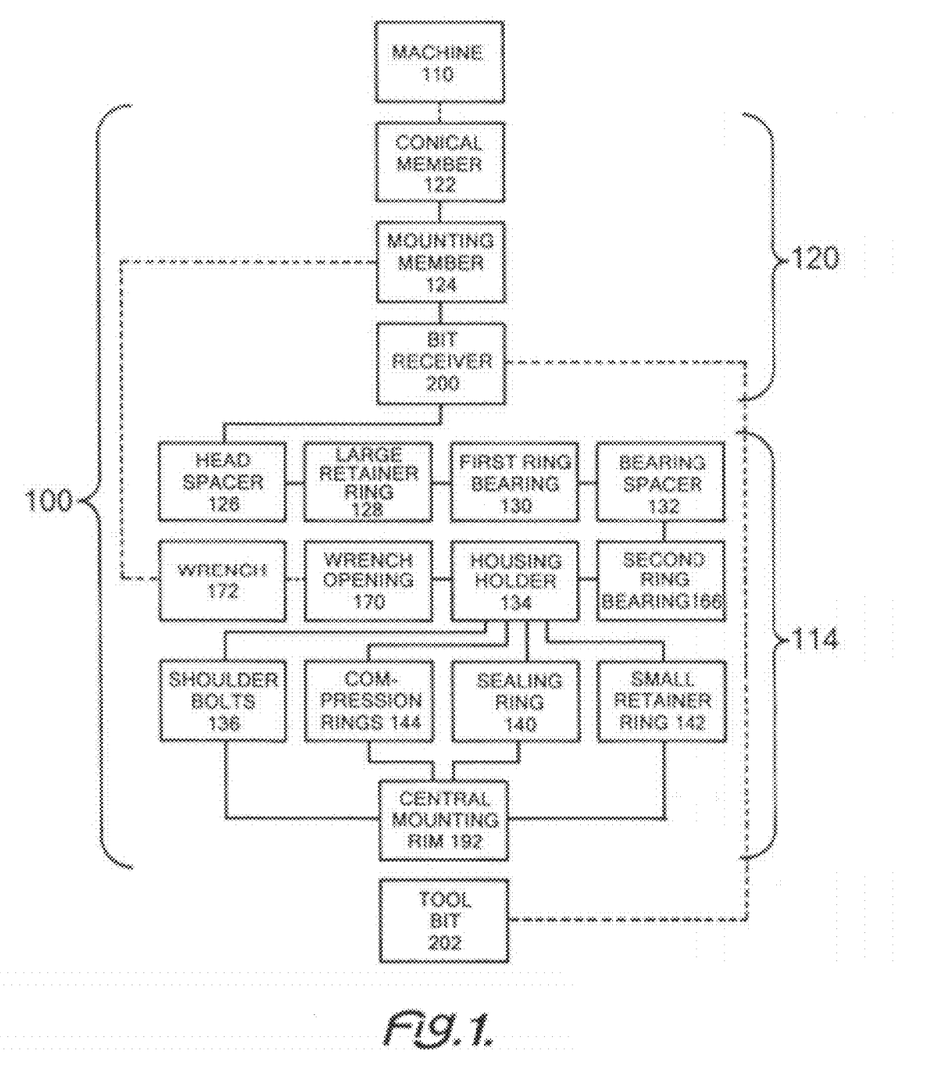
FIG. 1 depicts a block diagram of the tool head 100 of this invention positioned in the machine tool 110.

In FIG. 1, tool head 100 is secured in machine tool 110. More particularly, tool head 100 has a stay down assembly 114 (FIG. 10) cooperating with a tool holder 120. Tool holder 120 includes a conical member 122, which fits into machine tool 110. To the conical member 122 is secured a mounting member 124, which in turn holds a bit receiver 200.

Bit receiver 200 has head spacer 126 communicating sequentially with a large retaining ring 128, a first ring bearing 130, a bearing spacer 132, a second ring bearing 166 mounted within a holder housing 134. Holder housing 134 is preferably secured to conical member 122 through a snap fitting though any suitable securing mechanism can be used. From holder housing 134 and oppositely disposed from conical member 122 is central mounting rim 192. Central mounting rim 192 holds small retaining ring 142 in communication with sealing ring 140 and compression springs 144 on holder housing 134.

If desired vacuum 112 of machine tool 110 can hold material 220, preferably at a central portion thereof, while tool head 100 machines the material edge 222 thereof. With the structure of the tool head 100, and vacuum 112 of the machine tool 110, the edge 222 is very efficiently shaped, at a far faster and more efficient pace than is currently available.

Now adding FIG. 2, FIG. 2a, FIG. 3, FIG. 4, FIG. 5, FIG. 6, FIG. 7 and FIG. 8, to the consideration, tool head 100 has a tool holder 120 at one end thereof. Tool holder 120 has a conical member 122 oppositely disposed from a mounting member 124. Fitting over the mounting member 124 is a head spacer 126. Fitting over both the mounting member 124 and the head spacer 126, is a large retaining ring 128. Adjacent to the large retaining ring 128 is a first ring bearing 130. The first ring bearing 130 has bearing spacer 132 inserted therein. A holder housing 134 receives all of these elements and supports them on the mounting member 124.

Shoulder bolts 136 secure the spring base 138 to the holder housing 134. Between the spring base 138 and holder housing 134 are mounted a sealing ring 140, and a small retaining ring 142. Coil springs or compression springs 144 are supported between the holder housing 134 and the spring base 138. Additionally, the sealing ring 140 supports the compression springs 144 on an exterior thereof, while the small retaining ring 142 supports the compression springs 144 on the interior of the circle 152 formed thereby. The bottom of holder housing 134 has spring supports 184 to further support compression springs 144.

Figure 2:
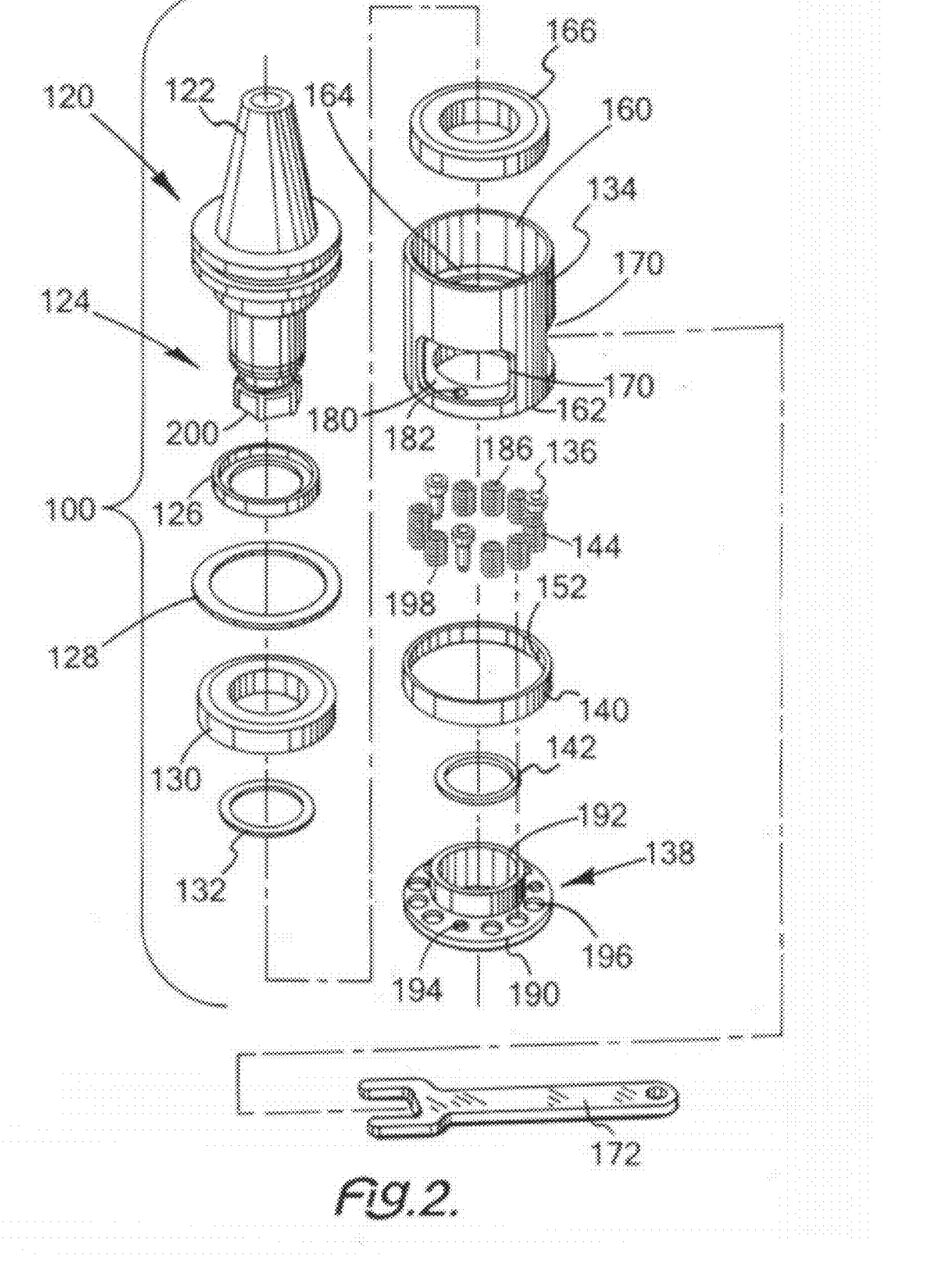
FIG. 2 depicts an exploded, perspective view of tool head 100 of this invention.
Figure 2A:
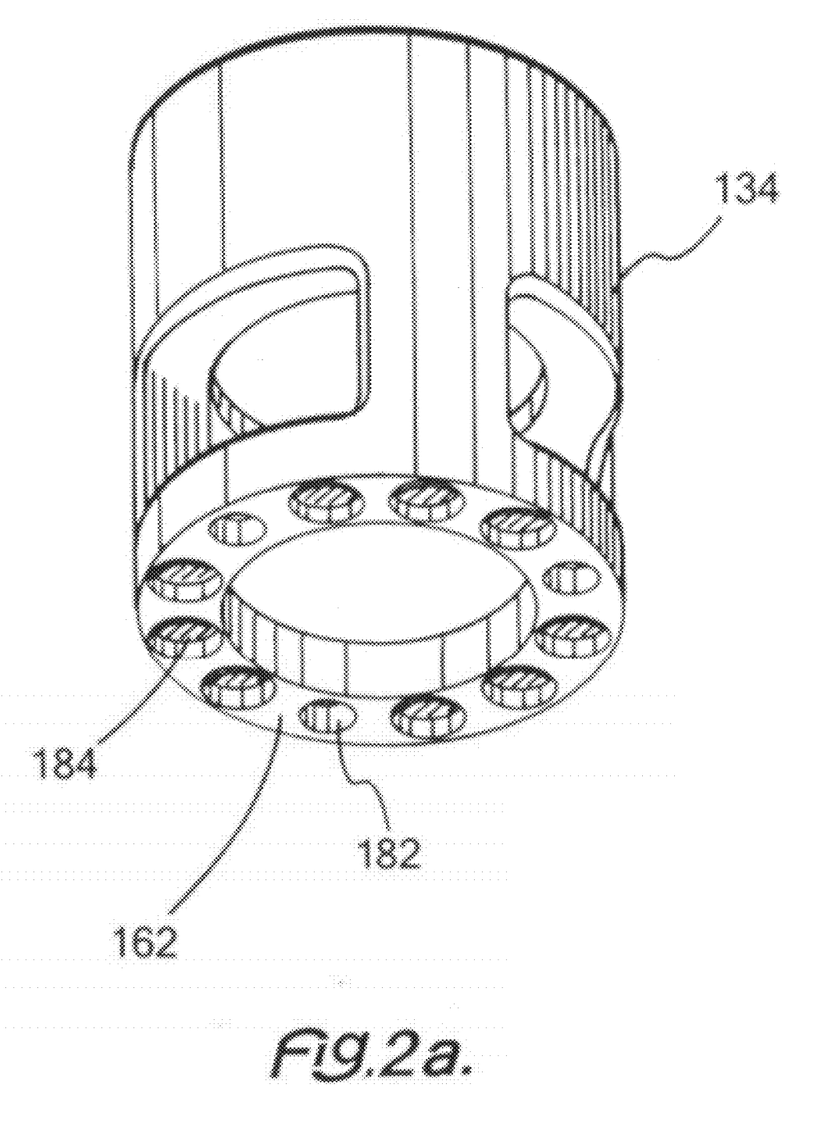
FIG. 2a depicts a bottom perspective view of holder housing 134 of this invention.
Figure 3:
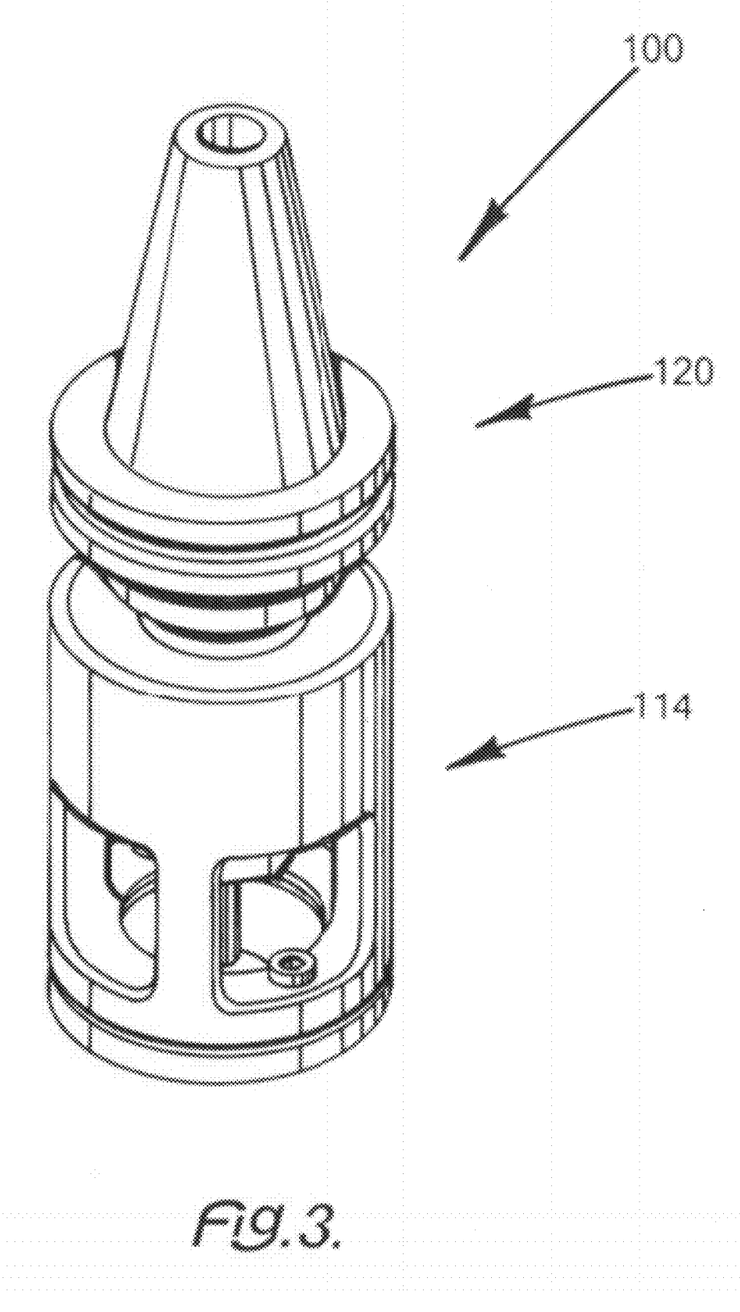
FIG. 3 depicts a top perspective view of tool head 100 of this invention.
Figure 4:
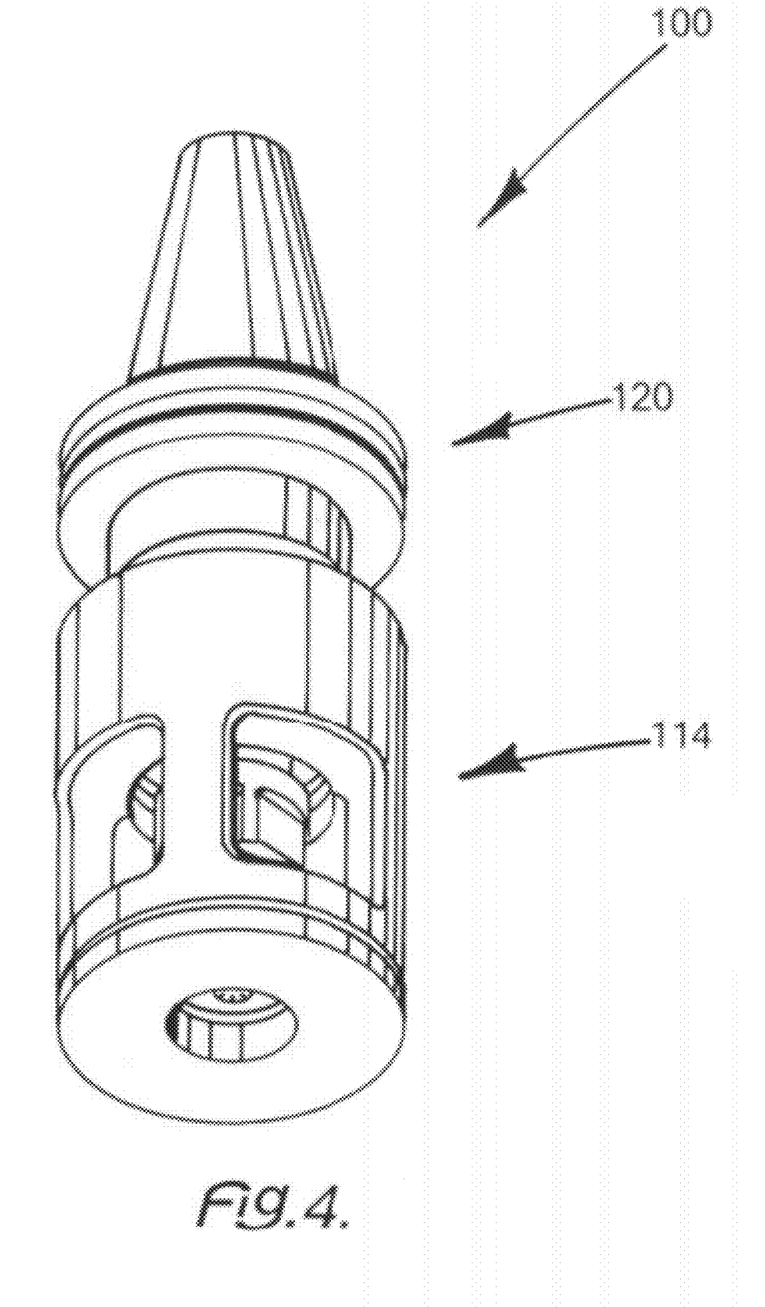
FIG. 4 depicts a bottom perspective view of tool head 100 of this invention.
Figure 5:
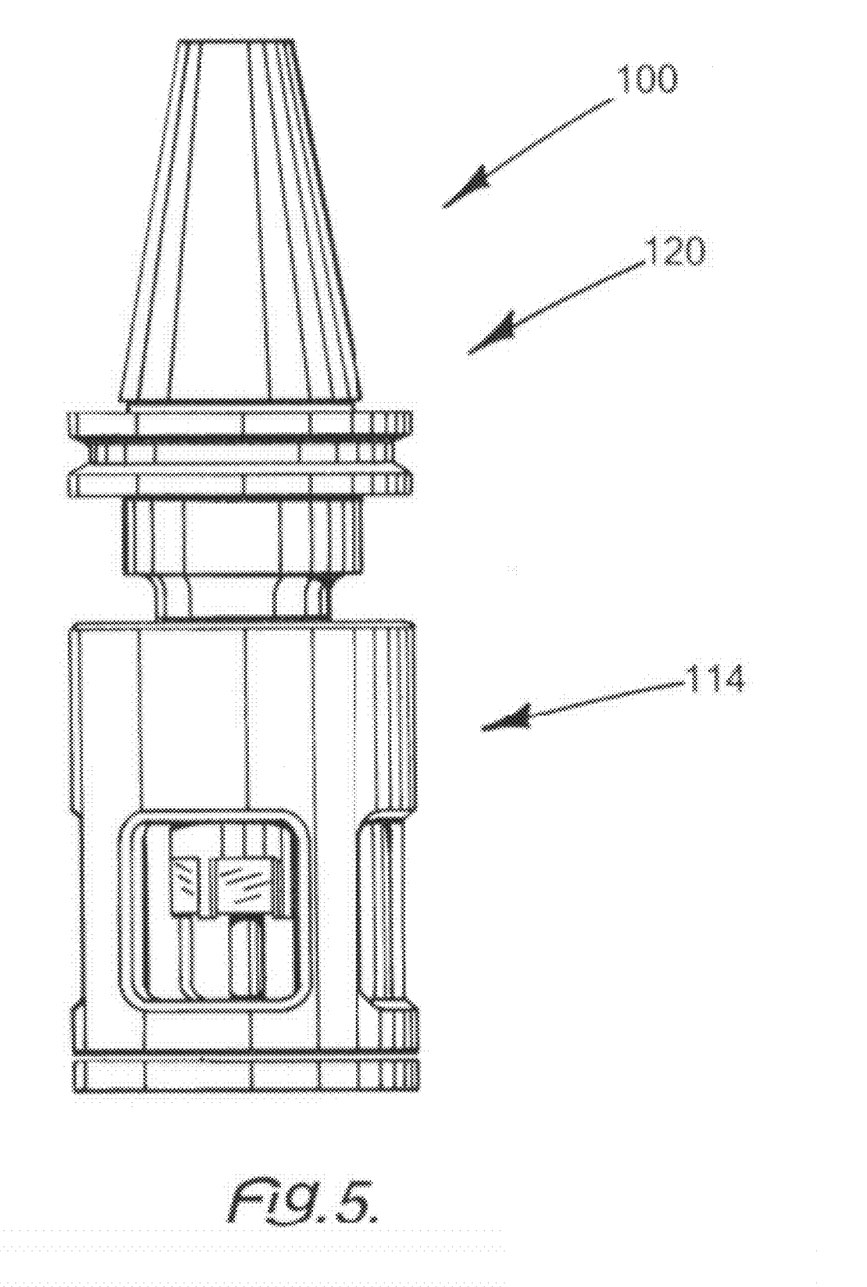
FIG. 5 depicts a side view of tool head 100 of this invention.
Figure 6:
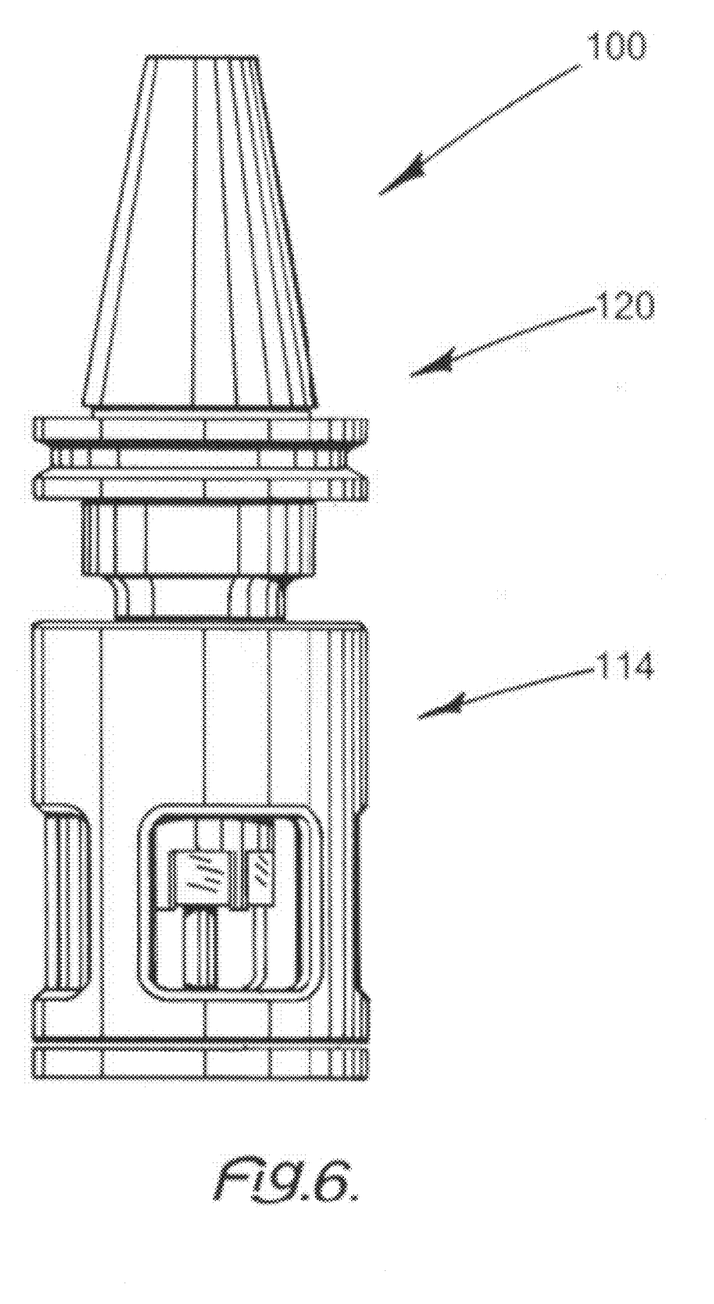
FIG. 6 depicts a side view of tool head 100 of this invention, rotated 180 degrees about the vertical axis as based on FIG. 5.
Figure 7:
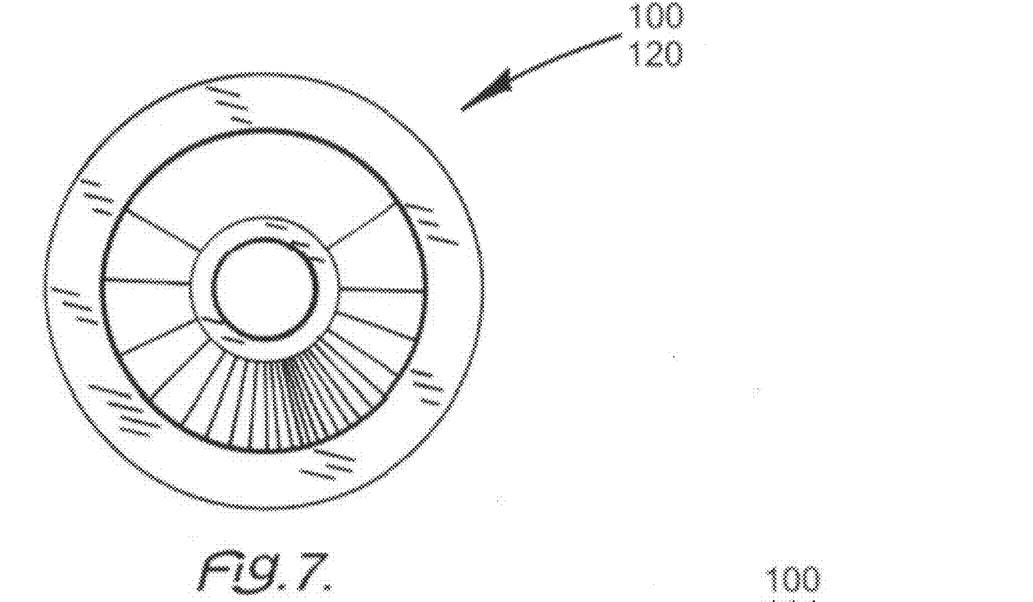
FIG. 7 depicts a top plan view of tool head 100 of this invention.
Figure 8:
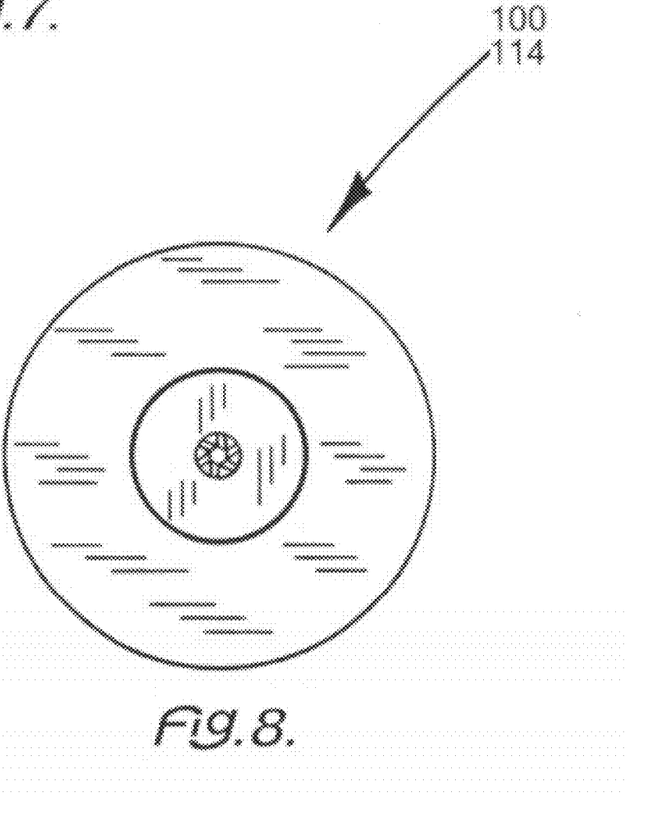
FIG. 8 depicts a bottom plan view of tool head 100 of this invention.

As the holder housing 134 receives all these elements, the holder housing 134 has an open end 160 and a receiving end 162 oppositely disposed therefrom. Positioned between the open end 160 and the receiving end 162 is a bearing platform 164 on the interior of holder housing 134, which leaves holder housing 134 still as a hollow cylinder.

As such, second ring bearing 166 fits into open end and rests on bearing platform 164. Adjacent thereto is bearing spacer 132 and first ring bearing 130.

Then over first ring bearing 130 is large retaining ring 128 followed by head spacer 126. Between bearing platform 164 and receiving end 162 are wrench openings 170 to receive wrench 172.

Receiving end 162 includes bolt platform 180. Bolt platform 180 includes a bolt aperture 182 for each shoulder bolt 136. Between each bolt aperture 182 are preferably upper spring supports 184. An upper end 186 of each compression spring 144 fits into each upper spring support 184.

To cooperate with receiving end 162, spring base 138 has an appropriate structure, with an outer mounting rim 190 with a central mounting rim 192 centrally located therein. Outer mounting rim 190 includes a threaded indentation 194 for each of shoulder bolt 136. Between each threaded indentation 194 is a lower spring support 196 to receive a lower end 198 of each compression spring 144. In this fashion, spring base 138 is secured. Thus, spring base 138 has the ability to hold a plastic edge for shaping.

By the same token, large retaining ring 128 of tool holder 120 in holder housing 134 has a conical member 122 oppositely disposed from a mounting member 124. Wrench 172 can access mounting member 124 through wrench openings 170. Mounting member 124 includes bit receiver 200. Wrench 172 tightens or loosens bit receiver 200, as desired.

Figure 9:
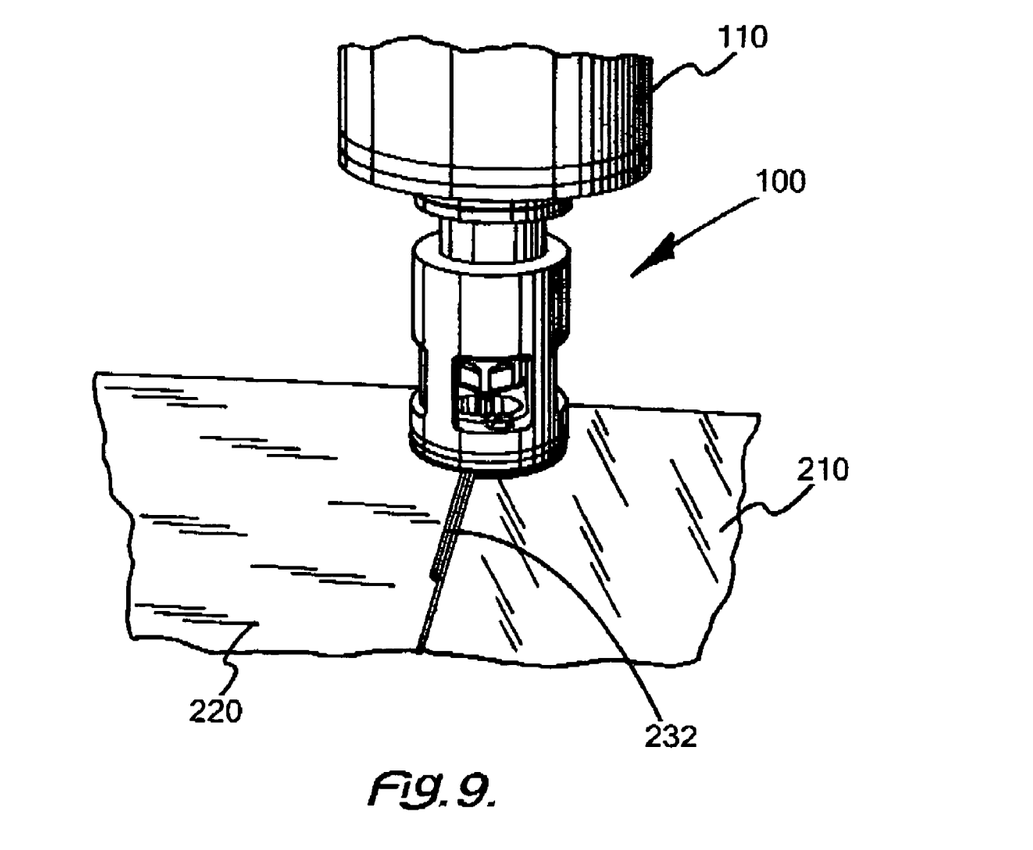
FIG. 9 depicts a perspective view of tool head 100 of this invention in machine tool 110.
Figure 10:
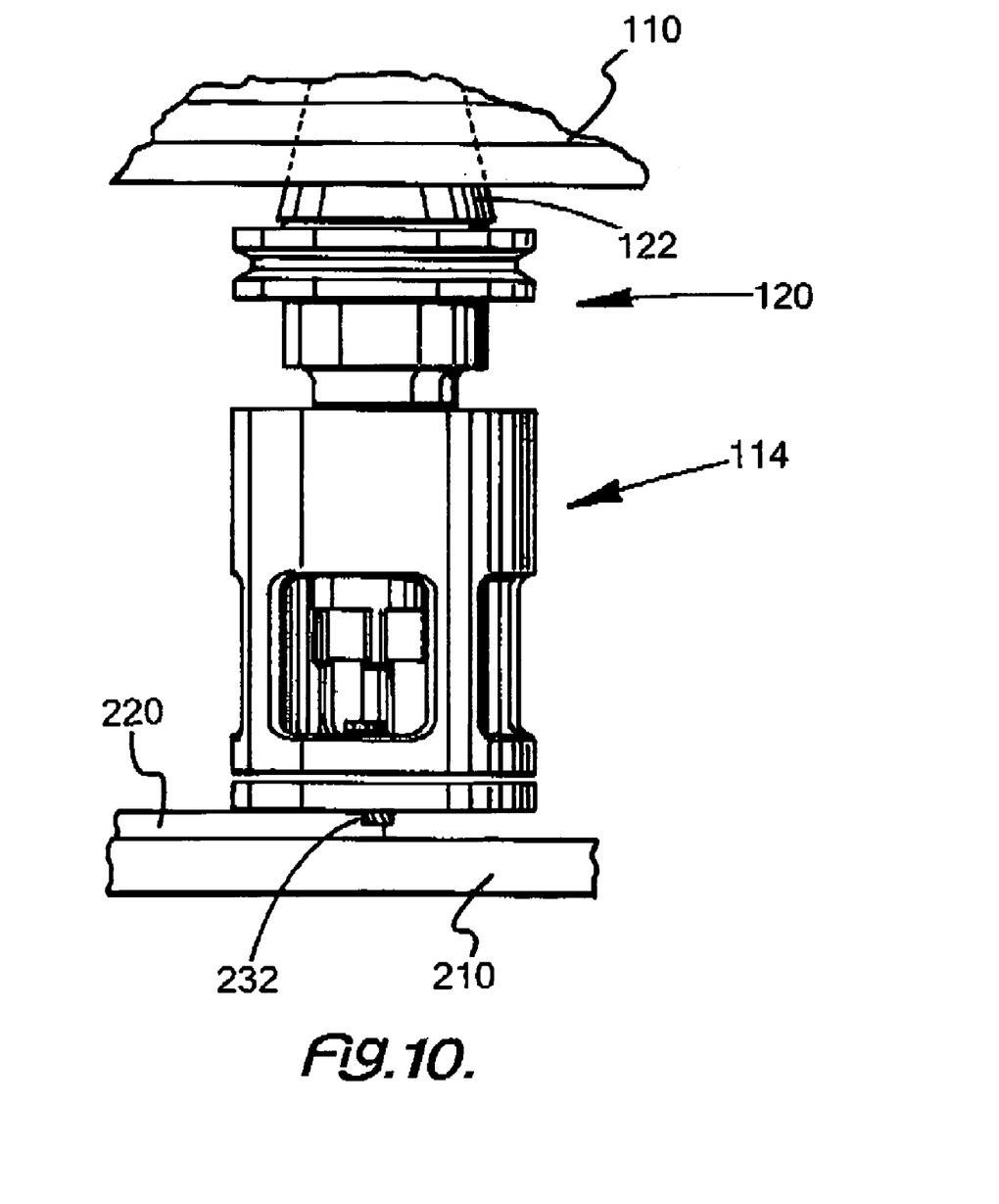
FIG. 10 depicts a side view of tool head 100 of this invention in machine tool 110.

Still adding FIG. 9 and FIG. 10 to the consideration, the use of tool head 100 on machine tool 110 on machine table 210 permits material 220 to have a machined edge 232 at lower end 198 with a drill bit receiver 200 of tool head 100. The tool head 100 or material 220, such as a plastic sheet, may be secured in the machine tool in any desired fashion.

A vacuum (not shown) on the machine tool 110 holds material 220 down while, machined edge 232 is formed. Compression springs 144 (FIG. 2) permit machined edge 232 of material 220 to be formed efficiently.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A tool head for a machine tool comprising:
   a) the tool head holding and shaping an edge of a sheet of material for use in a manufacturing treatment;
   b) the tool head including a cylindrical housing;
   c) the tool head having a mounting head secured to a machining head;
   d) the mounting head being securable in the machine tool;
   e) the machining head being adapted to contact the sheet of material;
   f) the cylindrical housing having an open end to receive the machining head;
   g) the machining head being bearing supported and spring loaded to facilitate contact with and shaping of the edge;
   h) the cylindrical housing having a closeable end to receive the mounting head;
   i) the cylindrical housing having an open end oppositely disposed from the closeable end;
   j) the machining head being at the open end;
   k) the machining head receiving a bearing support;
   l) the bearing support connecting a machining surface to the cylinder;
   m) the bearing support including a spring assembly to hold the machining surface in a desired position as the tool head moves around the edge;
   n) the cylindrical housing including a cylinder wall;
   p) the cylinder wall having at least one opening, so that coolant may flow around the machining surface and cool the same if desired;
   q) the mounting head including a conical member;

r) the mounting member including a bit receiver;
s) the bit receiver having a head spacer;
t) the head spacer communicating sequentially with a large retaining rind, a first ring bearing, a bearing spacer and a second ring bearing;
u) the large retainer ring, the first ring bearing, the bearing spacer and the second ring bearing being mounted within the holder housing;
v) the holder housing including a central mounting rim oppositely disposed from the conical member; and
w) the central mounting rim holding a small retainer ring in communication with a sealing ring and at least one compression spring on the holder housing.

2. The tool head of claim 1 further comprising:
a) the head spacer fitting over the mounting member;
b) the large retaining ring fitting over both the mounting member and the head spacer;
c) the first ring bearing being adjacent to the large retaining ring; and
d) the first ring bearing having a bearing spacer inserted therein.

3. The tool head of claim 2 further comprising:
a) the holder housing including a bolt platform adjacent to the open end;
b) a spring base being secured over the open end to the bolt platform;
c) a plurality of compression springs being supported between the bolt platform and the spring base in a circle;
d) the sealing ring supporting the plurality of compression springs on an exterior thereof; and
e) the small retaining ring supporting the plurality of the compression springs on an interior thereof.

4. The tool head of claim 3 further comprising:
a) the second ring bearing fitting into the open end and resting on the bearing platform;
b) the second ring bearing having adjacent thereto the bearing spacer and the first ring bearing;
c) the large retaining ring being positioned over the first ring bearing and followed by the head spacer; and
d) at least one wrench opening in the cylinder wall to receive a wrench for mounting the tool head.

5. The tool head of claim 4 further comprising:
a) the bolt platform including at least one bolt aperture for a shoulder bolt;
b) the shoulder bolt connecting the bolt platform to the spring base;
c) the spring base having an edge with a central mounting rim centrally located therein;
d) the edge rim including a threaded indentation for each of the at least one shoulder bolt; and
e) each member of the plurality of compression springs having an upper end and a lower end.

6. The tool head of claim 5 further comprising:
a) the at least one threaded indentation being at least a first threaded indentation and a second threaded indentation;
b) at least one lower spring support between the first threaded indentation and the second threaded indentation;
c) the at least one lower spring support receiving the lower end;
d) the at one least bolt aperture being at least a first bolt aperture and a second bolt aperture;
e) at least one upper spring support being positioned between the first bolt aperture and the second bolt aperture; and
f) the at one upper spring support receiving the upper end.

7. The tool head of claim 6 further comprising:
a) the at least one threaded indentation being the first threaded indentation, the second threaded indentation and a third threaded indentation;
b) the at least one lower spring support between the first threaded indentation, the second threaded indentation and the third threaded indentation being at least a first lower spring support and a second lower spring support;
c) the at one least bolt aperture being the first bolt aperture, the second bolt aperture and a third bolt aperture;
d) the at least one upper spring support being a first upper spring support and a second upper spring support;
e) the first lower spring support cooperating with the first upper spring support a first member of the plurality of compression springs;
f) the second lower spring support cooperating with the second upper spring support a second member of the plurality of compression springs; and
g) a drill bit receiver being adjacent to the first lower spring support and the second lower spring support.

8. In a machine tool for shaping an edge of a plastic sheet, the improvement comprising:
a) a tool head with a spring base being mounted in the machine tool;
b) the tool head holding and shaping an edge of a sheet of material for use in a manufacturing treatment;
c) the tool head having a mounting head secured to a machining head;
d) the mounting head being securable in the machine tool;
e) the machining head being adapted to contact the sheet of material;
f) the machining head including a cylindrical housing;
g) the cylindrical housing having an open end to receive the machining head;
h) the machining head being bearing supported and spring loaded at the spring base to facilitate contact with and shaping of the edge;
i) the cylindrical housing having a closeable end to receive the mounting head;
j) the cylindrical housing having an open end oppositely disposed from the closeable end;
k) the machining head being at the open end;
l) the machining head receiving a bearing support;
m) the bearing support connecting a machining surface to the cylinder;
n) the bearing support including a spring assembly to hold the machining surface in a desired position as the tool head moves around the edge;
o) the cylindrical housing including a cylinder wall;
q) the cylinder wall having at least one opening, so that coolant may flow around the machining surface and cool the same if desired;
r) the mounting head including a conical member;
s) the mounting member including a bit receiver;
t) the bit receiver having a head spacer;
u) the head spacer communicating sequentially with a large retaining ring, a first ring bearing, a bearing spacer and a second ring bearing;
v) the large retainer ring, the first ring bearing, the bearing spacer and the second ring bearing being mounted within the holder housing;
w) the holder housing including a central mounting rim oppositely disposed from the conical member; and
x) the central mounting rim holding a small retainer ring in communication with a sealing ring and at least one compression spring on the holder housing.

9. The machine tool of claim 8 further comprising:
a) the head spacer fitting over the mounting member;
b) the large retaining ring fitting over both the mounting member and the head spacer;
c) the first ring bearing being adjacent to the large retaining ring;
d) the first ring bearing having a bearing spacer inserted therein;
e) the holder housing including a bolt platform adjacent to the open end;
f) a spring base being secured over the open end to the bolt platform;
g) a plurality of compression springs being supported between the bolt platform and the spring base in a circle;
h) the sealing ring supporting the plurality of compression springs on an exterior thereof; and
i) the small retaining ring supporting the plurality of the compression springs on an interior thereof.

10. The machine tool of claim 9 further comprising:
a) the second ring bearing fitting into the open end and resting on the bearing platform;
b) the second ring bearing having adjacent thereto the bearing spacer and the first ring bearing;
c) the large retaining ring being positioned over the first ring bearing and followed by the head spacer; and
d) at least one wrench opening in the cylinder wall to receive a wrench for mounting the tool head.

11. The machine tool of claim 10 further comprising:
a) the bolt platform including at least one bolt aperture for a shoulder bolt;
b) the shoulder bolt connecting the bolt platform to the spring base;
c) the spring base having an edge with a central mounting rim centrally located therein;
d) the edge rim including a threaded indentation for each of the at least one shoulder bolt; and
e) each member of the plurality of compression springs having an upper end and a lower end.

12. The machine tool of claim 11 further comprising:
a) the at least one threaded indentation being at least a first threaded indentation and a second threaded indentation;
b) at least one lower spring support between the first threaded indentation and the second threaded indentation;
c) the at least one lower spring support receiving the lower end;
d) the at one least bolt aperture being at least a first bolt aperture and a second bolt aperture;
e) at least one upper spring support being positioned between the first bolt aperture and the second bolt aperture; and
f) the at one upper spring support receiving the upper end.

13. The machine tool of claim 12 further comprising:
a) the at least one threaded indentation being the first threaded indentation, the second threaded indentation and a third threaded indentation;
b) the at least one lower spring support between the first threaded indentation, the second threaded indentation and the third threaded indentation being at least a first lower spring support and a second lower spring support;
c) the at one least bolt aperture being the first bolt aperture, the second bolt aperture and a third bolt aperture;
d) the at least one upper spring support being a first upper spring support and a second upper spring support;
e) the first lower spring support cooperating with the first upper spring support a first member of the plurality of compression springs;
f) the second lower spring support cooperating with the second upper spring support a second member of the plurality of compression springs; and
g) a drill bit receiver being adjacent to the first lower spring support and the second lower spring support.

* * * * *